United States Patent [19]

Kroeger

[11] 4,156,478
[45] May 29, 1979

[54] ELECTRICALLY RELEASED ELECTROMAGNETIC FRICTION BRAKE

[75] Inventor: Edward R. Kroeger, Beloit, Wis.

[73] Assignee: Warner Electric Brake & Clutch Company, South Beloit, Ill.

[21] Appl. No.: 828,525

[22] Filed: Aug. 29, 1977

[51] Int. Cl.² ............................................. F16D 65/12
[52] U.S. Cl. ................................. 188/171; 188/206 R
[58] Field of Search .............................. 188/71.3–71.5, 188/170, 171, 266 R; 310/97

[56] References Cited

U.S. PATENT DOCUMENTS 3,470,987  10/1969  Kroeger ............................. 188/171
3,665,231  5/1972  Wendler ........................ 188/171 X Primary Examiner—Duane A. Reger
Attorney, Agent, or Firm—Leydig, Voit, Osann, Mayer & Holt, Ltd.

[57] ABSTRACT

An electromagnetic friction brake whose components are held in assembled relationship by pins which are received with a press fit within holes in an electromagnet and an end plate and which are received with a loose fit within holes in an armature. By virtue of the pins, an assembly gage may be used to automatically establish an air gap of desired width between the armature and the electromagnet when the brake is assembled.

5 Claims, 7 Drawing Figures

ELECTRICALLY RELEASED ELECTROMAGNETIC FRICTION BRAKE

BACKGROUND OF THE INVENTION

This invention relates to an electrically released brake of the type in which an electromagnet, an armature, a ring of friction material and an end plate are sandwiched together in an assembly. The ring of friction material is rotatable relative to the other elements of the assembly and is adapted to be connected to a driven member such as a rotatable shaft whose motion is to be retarded by the brake.

Upon energization of the electromagnet, the armature is drawn away from the ring of friction material and toward the electromagnet to release the brake. When the electromagnet is de-energized, springs associated with the electromagnet press the armature against the friction material and press the friction material against the end plate so as to apply the brake and frictionally retard rotation of the shaft.

To help optimize the braking torque and service life of a given brake, it is necessary to establish an air gap of predetermined axial width between the electromagnet and the armature. In prior brakes of this general type, the width of the air gap is established by manually adjusting screws or the like which hold the electromagnet, the armature and the end plate in assembled relationship. Trial and error is required to make such adjustments and thus the assembly procedure is relatively expensive and, in addition, the gap is not always established with the optimum width.

SUMMARY OF THE INVENTION

The general aim of the present invention is to provide a new and improved brake of the foregoing character in which an air gap of precise predetermined width may be established between the electromagnet and the armature automatically as an incident to these elements being assembled with the friction ring and the end plate, the brake thereby lending itself to quick, easy and accurate assembly.

A more detailed object is to provide a brake whose components are held in assembled relationship by pins which are pressed into the electromagnet and the end plate, such pins enabling the use of an assembly gage for establishing an air gap of precise width when the components are pressed together.

A further object of the invention is to provide a new and simplified method for assembling the components of a brake, the method enabling the brake to be assembled in less time than prior brakes and eliminating the need of using trial and error adjustments to establish the air gap.

The invention also resides in the provision of a unique brake having a multi-part friction ring which enables the brake to develop high braking torque and yet still experience a long service life.

These and other objects and advantages of the invention will become more apparent from the following detailed description when taken in conjunction with the accompanying drawings.

DETAILED DESCRIPTION OF THE PREFERRED EMBODIMENT

Figure 2:
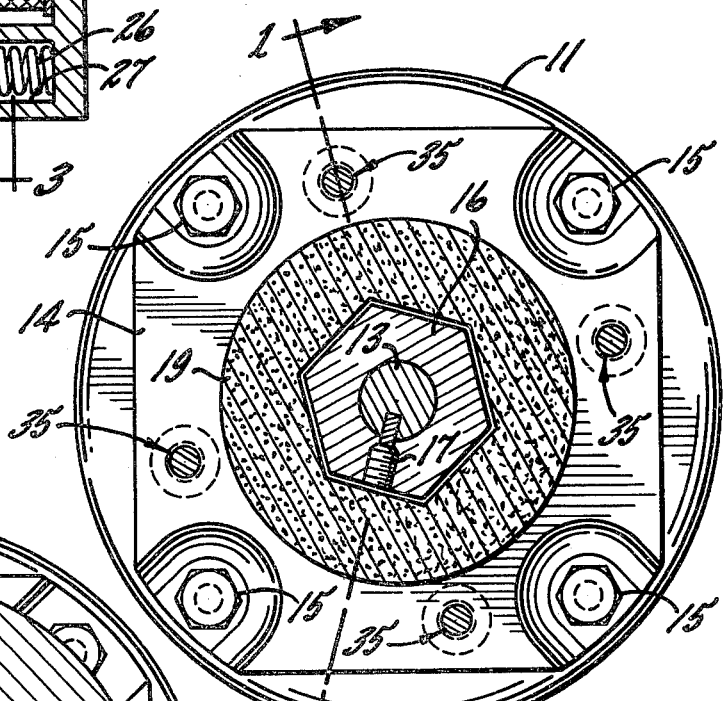
FIGS. 2 and 3 are cross-sections taken substantially along the lines 2—2 and 3—3, respectively, of FIG. 1.
Figure 3:
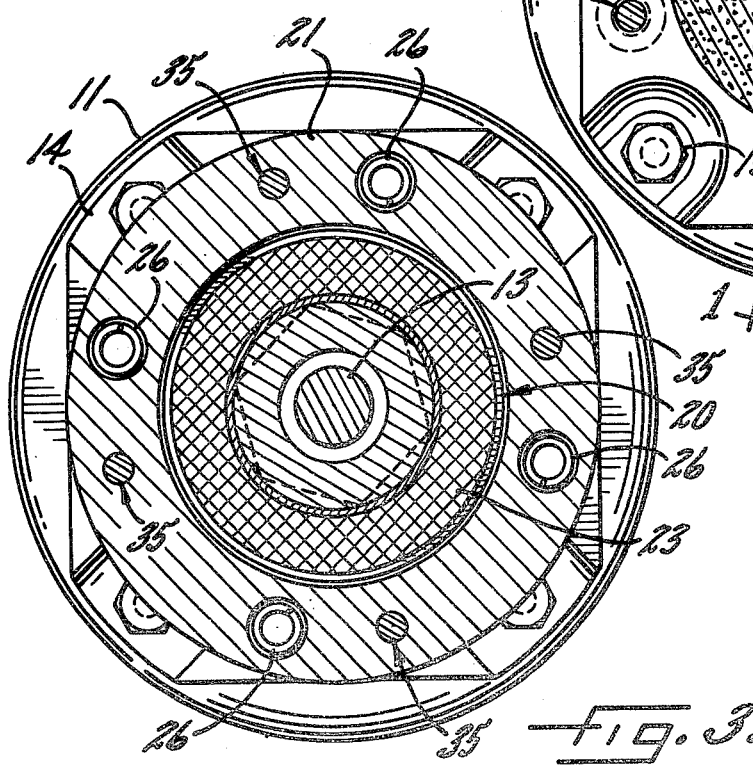

As shown in the drawings for purposes of illustration, the invention is embodied in an electromagnetic friction brake 10 of the type which may, for example, be attached to the end of an electric motor 11 to stop the shaft 13 of the motor at selected times. The brake includes an end plate 14 which may be anchored to the motor by screws 15 and further includes a hub 16 adapted to be fastened to the motor shaft by a set screw 17. As is conventional, the hub is formed with an outer periphery which is of hexagonal or other non-circular cross-section (see FIG. 2).

The brake 10 further includes a ring 19 of friction material adapted to rotate with the shaft 13 and the hub 16 and adapted to rotate relative to the end plate 14. The inner periphery of the ring is of hexagonal shape to enable the ring to turn with the hub.

Figure 1:
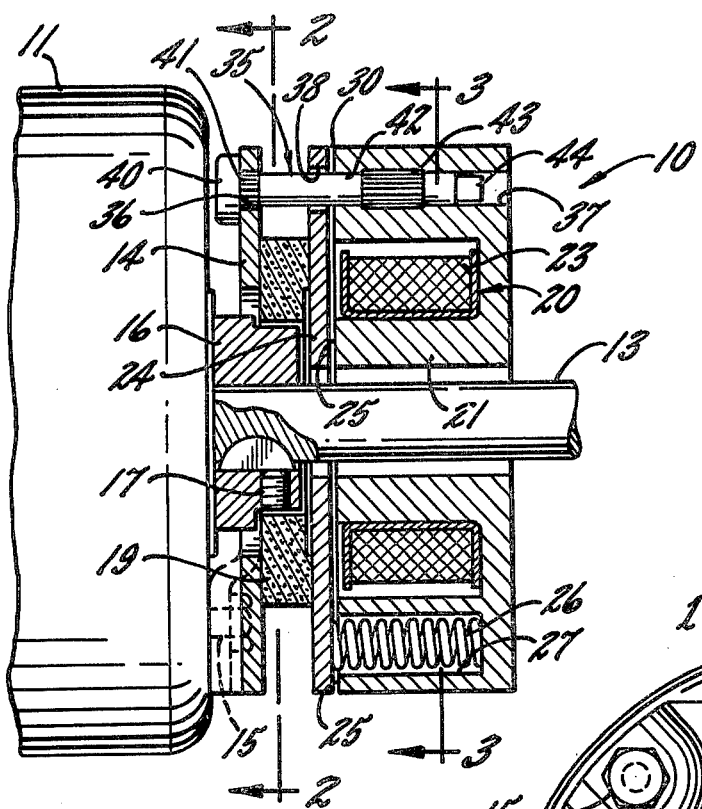
FIG. 1 is a side elevation of a typical motor equipped with a new and improved brake incorporating the unique features of the present invention, the brake being shown in a section taken substantially along the line 1—1 of FIG. 2.

Braking of the shaft 13 is effected in response to the de-energization of an electromagnet 20 (FIG. 1). Herein, the electromagnet includes an annular shell 21 made of cast iron or the like and enclosing an annular coil or winding 23 which is adapted to be connected by leads (not shown) to a suitable voltage source. When the coil is energized, an annular armature 24 is drawn away from the friction ring 19 and into engagement with the pole faces 25 of the shell 21 so as to release the friction ring and enable the shaft 13 to rotate. Upon de-energization of the coil, springs 26 press the armature 24 against one face of the friction ring and press the other face of the friction ring against the end plate 14 to stop the shaft. In the present instance, the springs are of the coiled compression type and four such springs are located within angularly spaced openings 27 formed in the shell 21.

When the brake 10 is being manufactured, it is important to assemble the components in such a manner that an air gap 30 (FIG. 1) of a precisely predetermined axial width will exist between the armature 24 and the pole faces 25 of the shell 21 when the coil 23 is de-energized. In one of its aspects, the present invention contemplates the provision of a unique brake which is constructed so that an air gap 30 of a precisely predetermined axial width may be established automatically between the armature 24 and the pole faces 25 of the shell 21 when the components of the brake are assembled. In another of its aspects, the invention contemplates a novel method of assembling the brake, the method eliminating the need of manually adjusting the components to establish the air gap and thus enabling the brake to be assembled with greater preciseness and at lower cost than prior brakes of the same general type.

More specifically, the brake 10 is characterized by pins 35 which are adapted to be inserted with a tight press fit into angularly spaced holes 36 and 37 (FIG. 1)

in the end plate 14 and the shell 21, respectively, and with a loose fit in holes 38 in the armature 24. Herein, four such pins are employed and each includes a head 40 (FIGS. 1 and 4) which is significantly larger than the holes 36, a first rough portion 41 whose diameter is slightly larger than the diameter of the holes 36, a smooth intermediate portion 42 having a diameter significantly smaller than the diameter of the holes 36 and 38, a second rough portion 43 whose diameter is less than the diameters of the holes 36 and 38 but greater than the diameter of the holes 37, and a tip 44 having a diameter smaller than the diameter of the holes 37. The rough portions 41 and 43 may be created by forming straight knurls along the appropriate portions of each pin.

In the assembled brake 10, the head 40 of each pin 35 engages the end plate 14 while the knurled portions 41 and 43 are received with a press fit in the holes 36 and 37, respectively, so as to hold the end plate and the shell 21 in assembled relationship. The smooth intermediate portion 42 of each pin, however, is received in the hole 38 with a loose fit to enable the armature 24 to shift back and forth when the coil 23 is energized and de-energized, the pins preventing the armature from rotating. While the pins 35 are located outwardly of and do not extend through the friction ring 19, they do captivate the ring between the end plate 14 and the armature 24 and prevent the ring from being removed radially from between the plate and the armature. This is achieved by locating the pins such that the spacing between adjacent pins is less than the diameter of the friction ring.

Figure 6:
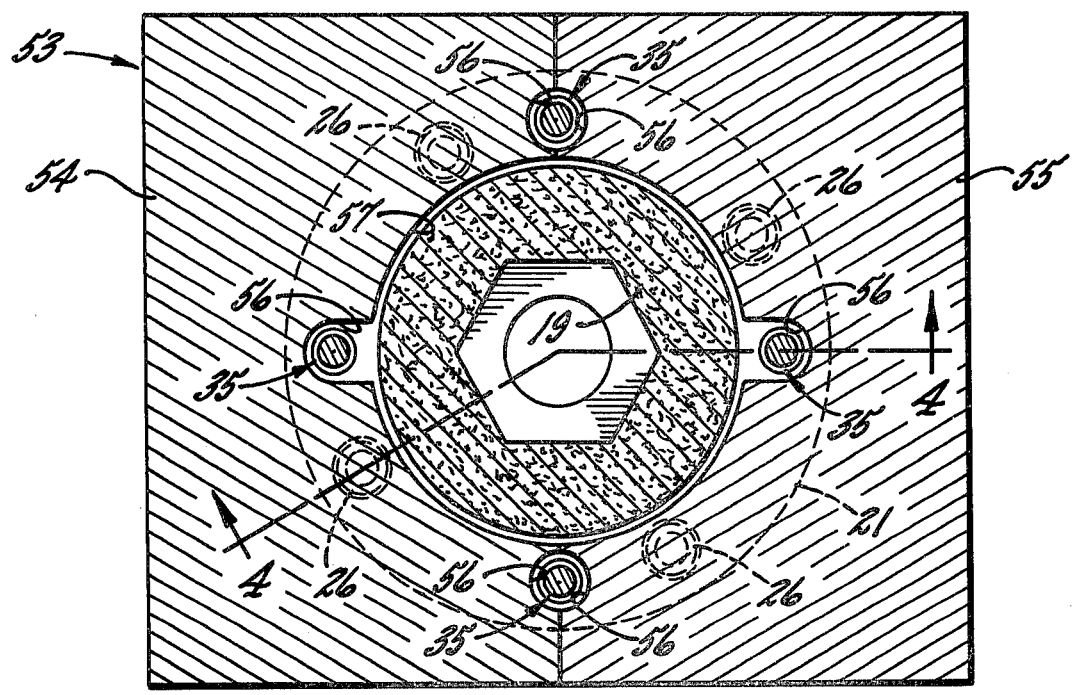
FIG. 6 is a cross-section taken substantially along the line 6—6 of FIG. 4.

By virtue of the pins 35, the components of the brake 10 may be assembled quickly and easily with a press having a horizontal bolster 50 (FIG. 4) and a vertically shiftable ram 51, the assembly method making use of a gage 53 which establishes the air gap automatically when the components are assembled. In the present instance, the gage comprises two identical gage plates 54 and 55 (FIGS. 4 and 6) adapted to be inserted between the end plate 14 and the armature 24 and each formed with angularly spaced semi-circular notches 56 (FIG. 6) which receive the pins 35 when the gage plates are in place. In addition, each gage plate is formed with a comparatively large and centrally located semi-circular notch 57 whose wall extends around the friction ring 19.

The axial thickness of the gage plates 54 and 55 is greater than the axial thickness of the friction ring 19 with the difference between the two thicknesses determining the width of the air gap 30 between the armature 24 and the pole faces 25 of the shell 21. Gage plates of greater or lesser thickness than the gage plates 54 and 55 may be used to establish wider or narrower air gaps but the thickness of the gage plates should always be greater than the thickness of the friction ring.

Figure 4:
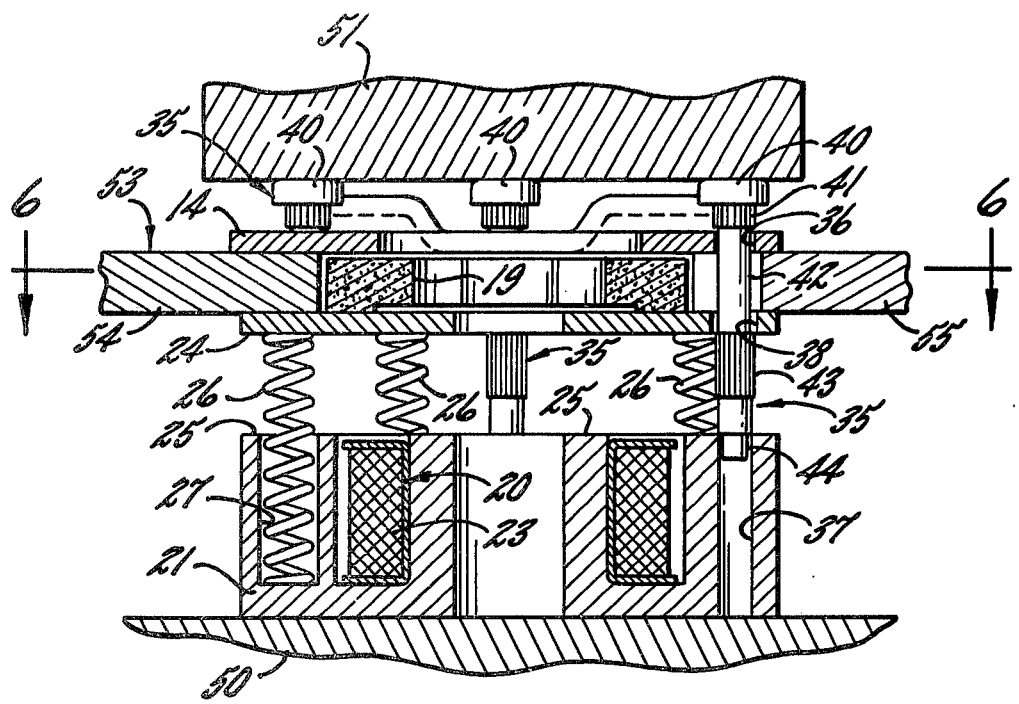
FIG. 4 is a fragmentary cross-section showing one step of assembling the brake.
Figure 5:
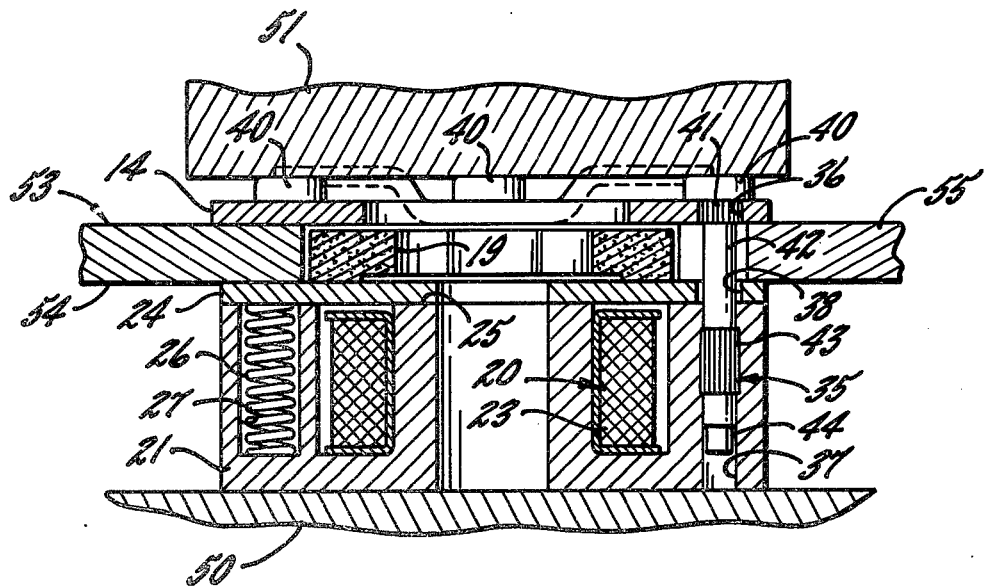
FIG. 5 is a view similar to FIG. 4 but shows a subsequent step of assembling the brake.

To assemble the brake 10, the electromagnetic subassembly comprising the shell 21, the coil 23 and the springs 26 is placed on the bolster 50 of the press with the springs extending upwardly as shown in FIG. 4. The armature 24 then is placed on top of the springs and is located such that the holes 38 in the armature are alined with the holes 37 in the shell 21, the springs holding the armature in upwardly spaced relation from the shell. Thereafter, the friction ring 19 is placed on top of the armature and then the end plate 14 is placed on top of the friction ring in such a position that the holes 36 in the end plate are alined with the holes in the armature and the shell.

The pins 35 then are inserted through the holes 36 and 38 in the end plate 14 and the armature 24 and are piloted into the holes 37 in the shell 21, the reduced diameter tips 44 of the pins enabling partial insertion of the pins into the holes 37. Thereafter, the two gage plates 54 and 55 are slipped radially between the end plate 14 and the armature 24 with the notches 56 in the gage plates receiving the pins 35 and with the notches 57 receiving the friction ring 19.

With the gage plates 54 and 55 and the components of the brake 10 thus arranged, the ram 51 of the press is lowered into engagement with the heads 40 of the pins 35 and is shifted downwardly to press the knurled portions 43 of the pins into the holes 37 in the shell 21. When the knurled portions 43 of the pins reach the holes 37, continued downward advancement of the ram causes the armature 24, the gage plates 54 and 55 and the end plate 14 to compress the springs 26 and to shift downwardly with the pins until the armature tightly engages the pole faces 25 of the shell 21 and until the gage plates tightly engage the armature and the end plate engages the gage plates. Final downward movement of the ram then presses the knurled portions 41 of the pins into the holes 36 and causes the heads 40 of the pins to engage the end plate 14.

With the knurled portions 41 and 43 of the pins 35 pressed into the holes 36 and 37, respectively, of the end plate 14 and the shell 21, the end plate, the gage plates 54 and 55, the armature 24 and the shell will remain in their pressed-together positions after the ram 51 has been retracted upwardly from the pins. When the ram has been so retracted, the gage plates 54 and 55 may be pulled radially from between the end plate 14 and the armature 24. As an incident thereto, the springs 26 will force the armature away from the pole faces 25 of the shell until the armature presses the friction ring 19 against the end plate 14, the armature moving through a distance equal to the difference between the thickness of the gage plates and the thickness of the friction ring. Accordingly, the air gap 30 between the armature 24 and the pole faces 25 of the shell 21 is precisely and automatically established at a predetermined width as an incident to the components of the brake 10 being assembled.

Figure 7:
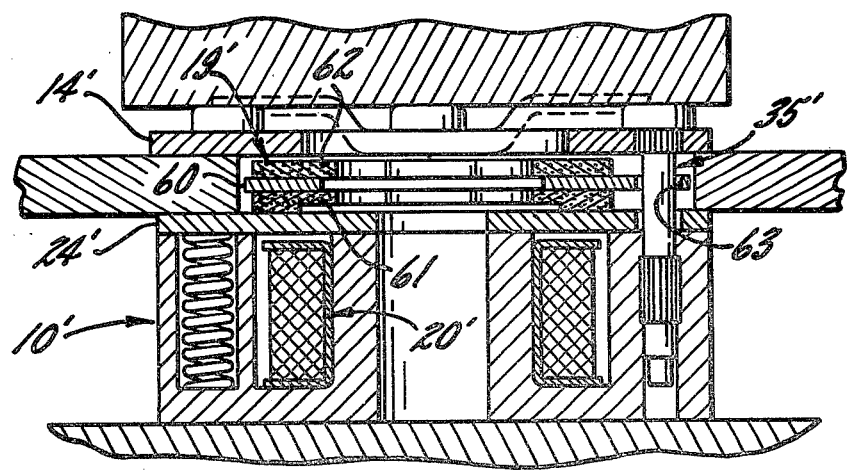
FIG. 7 is a view similar to FIG. 5 but shows a modified brake.

Another embodiment of a brake 10' incorporating the features of the invention is shown in FIG. 7 in which parts corresponding to those of the first embodiment are indicated by the same but primed reference numerals. The brake 10' is particularly characterized by the fact that it can develop higher braking torque and experience less wear than the brake 10.

More particularly, the friction ring 19' of the brake 10' is defined by an annular metal disc 60 which is sandwiched between two annular discs 61 and 62 of friction material. The metal disc 60 is formed with holes 63 which receive the pins 35' with a loose fit so as to prevent the metal disc from turning while permitting that disc to slide on the pins. The two friction discs 61 and 62 are located radially inwardly of the pins and are free to turn with the hub.

When the electromagnet 20' is de-energized, the armature 24' presses against the friction disc 61 which, in turn, presses the metal disc 60 against the friction disc 62. The latter disc is pressed against the end plate 14' and thus the brake 10' includes four pairs of surfaces disposed in frictional engagement rather than two pairs of surfaces as in the case of the brake 10. Accordingly, the braking torque of the brake 10' is virtually doubled and the service life of the brake is significantly increased. The brake 10' may be assembled in the same manner as the brake 10 as is apparent from FIG. 7.

I claim:

1. An electrically released brake comprising a shell, an armature, a ring of friction material, and a plate sandwiched together in the order named, said friction material being rotatable relative to said shell, said armature and said plate, an electromagnetic coil disposed within said shell, spring means disposed within said shell, said coil being operable when energized to draw said armature away from said friction material and being operable when de-energized to permit said spring means to press said armature into engagement with said friction material and to press said friction material into engagement with said plate, angularly spaced sets of alined holes formed in said shell, said armature and said plate, and a pin received within the holes of each set, said brake being characterized by said pins being received in the holes in the shell and the holes in the plate with a press fit to connect said shell rigidly with and in fixed spaced relation to said plate and being received in the holes in said armature with a loose fit to enable said armature to move away from and toward said friction material when said coil is energized and de-energized, the press fit between said pins and said shell being sufficiently tight to prevent any movement of said shell along said pins in either direction.

2. An electrically released brake as defined in claim 1 in which said ring of friction material is defined by two axially spaced annular discs of friction material, said brake further comprising a metal disc sandwiched between said discs of friction material, holes formed through said metal disc and alined with the holes in said shell, said armature and said plate, the holes in said metal disc receiving said pins with a loose fit to permit said metal disc to shift axially on said pins.

3. An electrically released brake as defined in claim 1 in which there are at least three of said pins, the spacing between adjacent pins being less than the diameter of said ring of friction material whereby said pins prevent said ring from being removed radially from between said armature and said plate.

4. An electrically released brake as defined in claim 1 in which a first portion of each pin disposed within the hole in said shell and a second portion of each pin disposed within the hole in said plate are formed with rough surfaces to enhance the press fit of said pins.

5. An electrically released brake as defined in claim 4 in which the diameter of said first portion of each pin is less than the diameter of said second portion of each pin.

* * * * *